Dec. 27, 1966   J. N. VANDER POL   3,294,407
FARM MACHINE TO LOAD, TRANSPORT AND SPREAD
LIQUID, SEMI-SOLID FERTILIZER
Filed Aug. 7, 1964

INVENTOR.
JOHN. N. VANDER POL

BY Smith & Mattern

ATTORNEYS

United States Patent Office 3,294,407
Patented Dec. 27, 1966

3,294,407
FARM MACHINE TO LOAD, TRANSPORT AND SPREAD LIQUID, SEMI-SOLID FERTILIZER
John N. Vander Pol, 111 N. Front St., Mount Vernon, Wash. 89273
Filed Aug. 7, 1964, Ser. No. 388,071
1 Claim. (Cl. 275—8)

This invention relates to farm machinery and more particularly to such machinery used to load, transport and spread fertilizer while it is in a liquid or semi-solid liquid mixture, such as liquid manure.

The purpose of the invention is to provide a farm machine which can be conveniently operated by a farmer from his tractor driving position as the farm machine is powered and maneuvered while coupled to his tractor during fertilizer loading, transporting and spreading operations.

The invention comprises: a wheeled trailer chassis assembly to enable a fertilizer container assembly to be transported over land when towed by a tractor; a fertilizer container assembly mounted on the wheeled trailer chassis assembly; a fertilizer pumping unit secured to the container assembly and adapted to be connected to and driven by a power take-off mechanism of a tractor to pump fertilizer into and out of the container; and valve mechanisms controllable by a tractor operator from his tractor driving position, to regulate the entry and discharge of fertilizer with respect to both the pumping unit and container.

A preferred embodiment of this invention is illustrated in the drawing, wherein.

Figure 1:
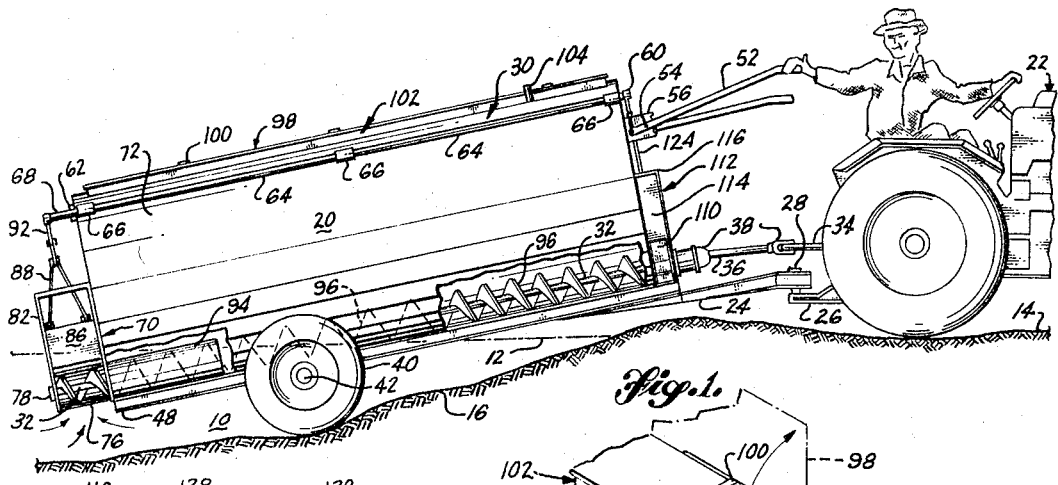
FIGURE 1 is a side elevation with some portions removed, showing a fertilizer loader and spreader coupled to a tractor during loading, the fertilizer container being submerged in part in a fertilizer holding pond or tank.
Figures 4, 5:
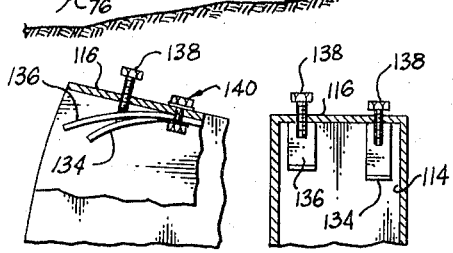
FIGURE 4 is a partial front view, with portions removed, of a top corner of side opening of the fertilizer distributor, showing placement and adjustment of adjustable flow guides.
FIGURE 5 is a sectional view of the top portion of the side opening of fertilizer distributor, showing positioning of side-by-side adjustable flow guides.

As indicated in FIGURE 1, fertilizer 10, such as liquid manure, is often collected in ponds or tanks 12 in rural areas and, thereafter, periodically distributed over farm fields 14. Generally, a slope approach or ramp 16 is provided at such a tank or pond 12 enabling access of farm machinery to process such fertilizer 10. In regard to this invention, such farm machinery is a fertilizer loader-transporter-spreader 20 which handles this fertilizer in its liquid or semi-solid liquid mixture.

Fertilizer loader-transporter-spreader 20 is preferably attachable to a farm tractor 22 for trailering by using a spreader-chassis 24 to tractor-chassis 26 hitching unit 28. Also for loading and spreading power, its power auger shaft 32 is indirectly connected to a power take-off shaft 34 on the tractor 22 by using a coupling shaft 36 having universal coupling units 38 at each of its ends. These universal couplings 38 and coupling shaft 36 arranged in conjunction with somewhat centrally located trailer wheels 40 and axle 42 secured to chassis 24 which in turn has downwardly deflected forward frame members 44 joined together at hitching unit 28, all make "backing and tilting" down the ramp 16 convenient.

Such "backing and tilting" places the rear intake end 48 of container assembly 30 of this loader-transporter spreader 20 in pond 12, as illustrated in FIGURE 1.

When this farm machine 20 is so positioned a farmer seated at his tractor operating position commences loading by moving handle 52, which is pivotally secured at pin 54 on an extension bracket 56 which in turn is supported on front 58 of container assembly 30. Pivoting of such handle 52 directly moves pivot pin (54) mounted connecting rod 60 which in turn rotates front crank arm 62. Such movement of crank arm 62 in turn partially rotates control rol 64 in its bearing mounts 66 which are spaced along container assembly 30. At rear-intake-end 48 of spreader 20, control rod 64 moves another crank arm 62 and its associated pivot pin 54 held connecting structure 68 to open and shut an inlet valve assembly 70.

At the rear 48, power auger shaft 32 preferably extends beyond container 72 of assembly 30. Such extending shaft portion is covered with a housing 76 secured to container 72. Housing 76 contains a shaft bearing 78 and serves in part as valve opening 80 and guiding 82 structures of inlet valve assembly 70. The valve closure plate 86 moves up in guides 82 to clear opening 80 when control rod 64 is partially rotated upon effective movements of crank arms 62. The valve closure plate 86 so moved, includes the top connecting structure 68 which, in turn, is pivotally joined through pin 54 to the crank arm 62 moved upon rotation of control rod 64.

Figure 2:
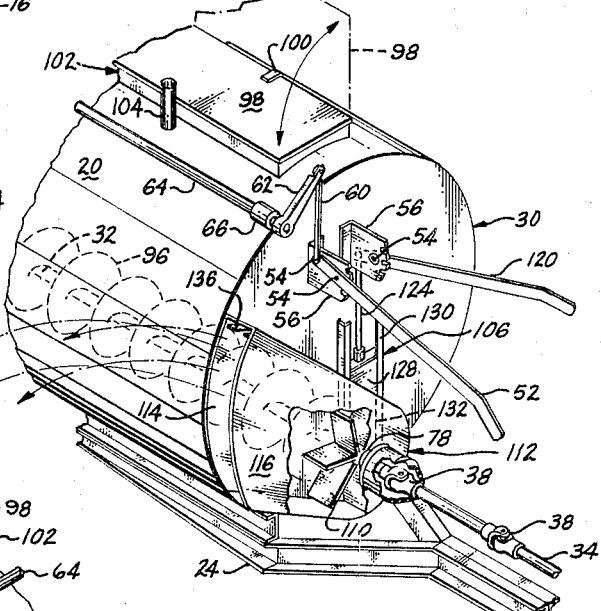
FIGURE 2 is a partial perspective view of the front portion of the fertilizer loader and spreader.
Figure 3:
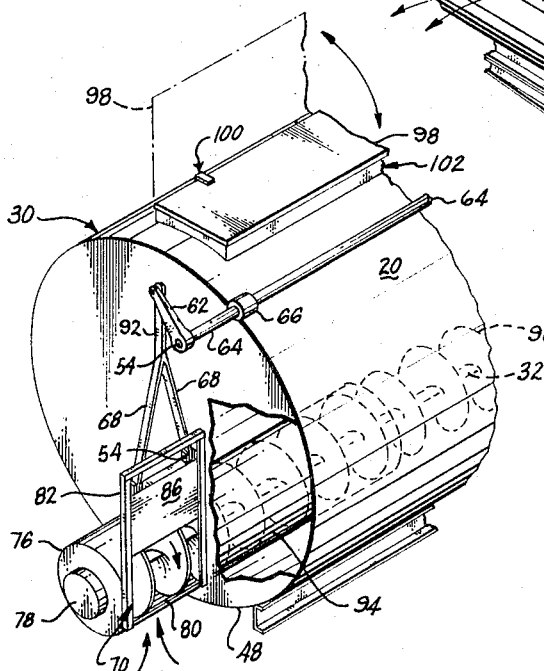
FIGURE 3 is a partial perspective view of the rear portion of the fertilizer loader and spreader.

Upon opening inlet valve assembly 70, and rotating auger shaft 32, as indicated in FIGURES 1 and 2, liquids and semi-solid-liquid mixtures of fertilizer are pumped into container 72 from pond 12. This pumping is made more effective by preferably adding a housing or tubular conduit 94 which surrounds blade 96 of auger shaft 32 a short distance, as an effective extension of housing 76 into the container 72 for a distance equaling approximately two place lengths of auger 96. When the container 72 is full, as may be determined by an inspection made through an opened top optional loading door 98 hinged 100 to assembly 102 or through a short overflow pipe 104 located on top of container assembly 30, the tractor operator's movement of control handle 52 closes inlet valve assembly 70 and shortly thereafter auger shaft 32 is stopped.

The loader container assembly 30 on its wheeled chassis 20 is then trailered over roadways to another farm field 14 where distribution of fertilizer is needed. When an operator of tractor 22 has maneuvered follow-on fertilizer-loader-transporter-spreader 20 into a field starting position, auger shaft 32 is powered as this farm machine 20 is driven back and forth across a field along spaced headings. At selective times, principally during all reasonably straight field row runs, an operator, in addition, opens outlet valve assembly 106 on front 58 of container assembly 30, so fertilizer will discharge into revolving blades 110 of a fertilizer fan-like centrifugal force distributor or spreader 112 driven by powered shaft 32. By moving blades 110 fertilizer is thrown clear of farm machine 20 for reasonably progressive and uniform deposit over field 14. Such departing or thrown fertilizer is guided by a side opening 114 housing 116 secured to container 72 and positioned to surround and support in part a forward extending section of power shaft 32 and its bearings 78 which controllably rotate distributor or spreader blades 110.

Opening of fertilizer outlet valve assembly 106 is initiated by pivoting a control handle 120, conveniently located within arm's reach of a seated tractor operator. As handle 120 is pivoted about its pivot pin 54 on extension bracket 122, which, in turn, secured to the front 58 of container 72, upward movement of pin mounted connecting link 124 occurs to open outlet valve assembly 106. Link 124 directly moves outlet valve closure plate 128 of this assembly 106 along its guides 130 to clear a valve opening 132 in container front 108.

Reverse movement of control handle 120 closes valve assembly 106 at respective ends of field row runs, while repositioning turn around maneuvers are undertaken. Upon commencing another field row at a spaced distance control handle 120 again is moved without a farmer and/or his operator leaving his tractor seating position to reinstate distribution of fertilizer as it is thrown out of side opening 114 of distributor 112. Variable control of fertilizer distribution is provided changing rotative speeds of the distributor 112 by changing tractor power gears, regulating valve opening of assembly 106 and adjusting flow guides 134, 136 by side opening 114. These guides are independently positioned, after their mounting on distributor 112, with a bolt-nut assembly 140, by turning adjustment bolts 138.

In operating a specific farm machine of an 800 gallon capacity which is optionally driven by a tractor having a power shaft capable of producing 30 horsepower, a container load of 800 gallons of fertilizer is loaded in two or less minutes from a pond. Upon arrival at a distribution area, contents of this container are distributed over field strips 20 to 40 feet wide during a discharging or spreading time ranging from 2 to 5 minutes. The 800 gallon capacity is provided by using a cylindrical tank 4'4" in diameter and 8' long, fabricated from 3/16 gauge metal such as steel.

In another specific farm machine, this tank was extended to be 12' long and to hold 1300 gallons. The tractor in turn could produce 40–45 horsepower through its power shaft.

A farmer or his agent, using this farm machinery, very quickly and very conveniently and also at relatively low cost, is now able to load, transport and spread liquid and semi-liquid-solid fertilizers such as manure. Conceivably, an entire operation can be undertaken with any tractor operator remaining on his tractor seat while he expertly conducts such operation by moving control handles 52 and 120 and by operating power shafts 32 and 34 during his sole maneuvering of tractor 22 and trailed fertilizer loading-transporting-spreading machine 20.

I claim:

A farm machine to load, hold, transport, and spread liquid and semi-solid fertilizer comprising:
 (a) a container adaptable to vehicle support;
 (b) openings near the front and rear of the container;
 (c) respective valve mechanisms to open and close the front and rear openings of the container;
 (d) an auger rotatably supported in the bottom of the container and extended rearwardly to the rear opening and to some portions of the rear valve mechanisms, and extended forwardly terminating in shaft-form near the front opening of the container and adaptable for connection to a powered shaft of a vehicle; and
 (e) a fertilizer spreader supported in part by the container about the front opening and about some portions of the front valve mechanism, and having spreader blades driven by the auger shaft.

References Cited by the Examiner
UNITED STATES PATENTS

| | | | |
|---|---|---|---|
| 2,057,403 | 10/1936 | Vali et al. | 214—83.32 X |
| 3,183,006 | 5/1965 | Herder | 275—8 |
| 3,189,354 | 6/1965 | Van der Lely et al. | 275—8 |
| 3,206,215 | 9/1965 | De Jong | 275—4 |

FOREIGN PATENTS 659,940  10/1951  Great Britain.

ABRAHAM G. STONE, *Primary Examiner.*

J. R. OAKS, *Assistant Examiner.*